(12) United States Patent
Chen et al.

(10) Patent No.: US 10,832,349 B2
(45) Date of Patent: Nov. 10, 2020

(54) MODELING USER ATTITUDES TOWARD A TARGET FROM SOCIAL MEDIA

(71) Applicant: International Business Machines Corporation, Armonk, NY (US)

(72) Inventors: Jilin Chen, Sunnyvale, CA (US); Huiji Gao, Phoenix, AZ (US); Jalal U. Mahmud, San Jose, CA (US); Michelle X. Zhou, Saratoga, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 983 days.

(21) Appl. No.: 14/293,094

(22) Filed: Jun. 2, 2014

(65) Prior Publication Data

US 2015/0347905 A1    Dec. 3, 2015

(51) Int. Cl.
G06N 5/04 (2006.01)
G06Q 50/00 (2012.01)
G06Q 30/02 (2012.01)

(52) U.S. Cl.
CPC ............. G06Q 50/01 (2013.01); G06N 5/043 (2013.01); G06Q 30/02 (2013.01)

(58) Field of Classification Search
CPC ................................ G06N 5/043; G06Q 50/01
See application file for complete search history.

(56) References Cited

U.S. PATENT DOCUMENTS

| | | |
|---|---|---|
| 8,478,702 B1 | 7/2013 | Treiser |
| 2010/0257117 A1 | 10/2010 | Shvadron et al. |
| 2012/0030020 A1* | 2/2012 | Bucak ............... G06Q 30/02 705/14.53 |
| 2013/0091117 A1 | 4/2013 | Minh |

(Continued)

OTHER PUBLICATIONS

Ren, Fuji, and Ye Wu. "Predicting user-topic opinions in twitter with social and topical context." IEEE Transactions on Affective Computing 4.4 (2013): 412-424.*

(Continued)

*Primary Examiner* — Miranda M Huang
*Assistant Examiner* — Kevin W Figueroa
(74) *Attorney, Agent, or Firm* — Cantor Colburn LLP; Daniel Johnson (57) ABSTRACT

Embodiments relate to user attitude modeling and behavior prediction for a social media network. One aspect includes collecting data relating to previously demonstrated sentiments, opinions, and actions attributed to network users toward a topic. Another aspect includes creating a model from the data, which includes factorizing the actions for behavior inference, factorizing auxiliary content from the network for opinion and sentiment inferences, and applying sentiment and opinion regularization to constrain user preferences on implicit topics to explicit sentiments and explicit opinions. Another aspect includes applying the model to a new user of the network with respect to the topic, and generating a prediction with respect to the user that includes predicting sentiment and opinion as a function of the auxiliary content and feature coefficients learned during a train- (Continued)

ing process, and predicting a future action of the user as a function of the auxiliary content and latent profiles of the topic.

18 Claims, 6 Drawing Sheets

(56) References Cited

U.S. PATENT DOCUMENTS

2013/0304686 A1    11/2013   Antin et al.

OTHER PUBLICATIONS

Duric, Adnan, and Fei Song. "Feature selection for sentiment analysis based on content and syntax models." Decision support systems 53.4 (2012): 704-711.*
Barragáns-Martínez, Ana Belén, et al. "A hybrid content-based and item-based collaborative filtering approach to recommend TV programs enhanced with singular value decomposition." Information Sciences 180.22 (2010): 4290-4311. (Year: 2010).*
Zhao, Jichang, et al. "Moodlens: an emoticon-based sentiment analysis system for chinese tweets." Proceedings of the 18th ACM SIGKDD international conference on Knowledge discovery and data mining. ACM, 2012. (Year: 2012).*
Artzi et al., "Predicting Responses to Microblog Posts," 2012 Conference of the North American Chapter of the Association for Computational Linguistics, Human Language Technologies, 2012, pp. 602-606.
Dabeer et al., "Improving Opinion Estimation from Tweets by Collaborative Filtering," Association for the Advancement of Artificial Interlligence, 2012, 4 pages.
Li, "Topic-Level Opinion Influence Model (TOIM): An Investigation Using Tencent Micro-Blogging," CIKM Conference, 2012, 38 pages.
Feng et al., "Retweet or not? Personalized Tweet Re-ranking," Tsinghua National Lab. for Information Science and Technology, Tsinghusa University, WSDM 13, 2013, pp. 577-586.
Fuji et al., "Predicting User-topic Opinions in Twitter with Social and Topical Context," IEEE Transactions on Affective Computing, vol. PP, Issue 99, Oct. 9, 2013, 14 pages.
Tao et al., "Bridging Domains with Words: Opinion Analysis with Matrix Tri-factorizations," In SDM, 2010, pp. 293-302.
Naveed et al., "Bad News Travel Fast: A Content-based Analysis of Interestingness on Twitter," WebSci 11, 2011, 7 pages.
Stieglitz et al., "Political Communication and Influence through Microblogging—An Empirical Analysis of Sentiment in Twitter Messages and Retweet Behavior," 2012 45th Hiwaii International Conference on System Sciences, 2012, pp. 3500-3509.
Barbosa et al.; "Robust Sentiment Detection on Twitter from Biased and Noisy Data"; Coling 2010: Poster Volume; Beijing, Aug. 2010; 9 pages.
Calais Guerra et al.; "From Bias to Opinion: a Transfer-Learning Approach to Real-Time Sentiment Analysis"; KDD 11, San Diego, California; Aug. 2011; 10 pages.
Davidov et al.; "Enhanced Sentiment Learning Using Twitter Hashtags and Smileys"; Coling 2010: Poster Volume; Beijing, Aug. 2010; 9 pages.
Jiang et al.; "Target-dependent Twitter Sentiment Classification"; Association for Computational Linguistics—Portland, Oregon (2011); 10 pages.
Kim et al.; "Sentiment Prediction using Collaborative Filtering"; Association for Advancement of Artificial Intelligence (2013); 4 pages.
Lin et al.; "Joint Sentiment/Topic Model for Sentiment Analysis"; CIKM, Nov. 2009; Hong Kong, China; 10 pages.
Luo et al.; "Examining Multi-factor Interactions in Microblogging Based on Log-linear Modeling"; ASONAM (2012); 5 pages.
O'Connor et al.; "From Tweets to Polls: Linking Text Sentiment to Public Opinion Time Series"; Proceedings of the International AAAI Conference on Weblogs and Social Media; May 2010; 8 pages.
Pang et al.; "A Sentimental Education: Sentiment Analysis Using Subjectivity Summarization Based on Minimum Cuts"; Department of Computer Science, Cornell University (2004); 8 pages.
Peng et al.; "Retweet Modeling Using Conditional Random Fields"; ICDM (2011); 8 pages.
Petty et al.; "Chapter 7—Mass Media Attitude Change—Implications of the Elaboration Likelihood Model of Persuasion"; New York: Routledge (2009); 21 pages.
Rofianto, W.; "Consumer Attitude Formation and Change—Week 6"; Lecture Relying on Consumer Behavior—Tenth Edition; Wordpress (2010); 16 pages.
Schein et al.; "Methods and Metrics for Cold-Start Recommendations"; University of Pennsylvania, Department of Computer & Information Science; Aug. 2002; 11 pages.
Schiffman et al.; "Chapter Eight—Consumer Attitude Formation and Change"; Consumer Behavior, Tenth Edition; Pearson Education, Inc. (2010); 58 pages.
Suh et al.; "Want to be Retweeted? Large Scale Analytics on Factors Impacting Retweet in Twitter Network"; IEEE International Conference on Social Computing (2010); 8 pages.
Tan et al.; "User-Level Sentiment Analysis Incorporating Social Networks"; KDD '11, San Diego, California; Aug. 2011; 9 pages.
Yang et al.; "Predicting the Speed, Scale, and Range of Information Diffusion in Twitter"; Association for the Advancement of Artificial Intelligence (2010); 4 pages.
Yang et al.; "Understanding Retweeting Behaviors in Social Networks"; CIKM—Toronto, Ontario, Canada; Oct. 2010; 4 pages.
Ye et al.; "Exploring Social Influence for Recommendation—A Probabilistic Generative Model Approach"; Pennsylvania State University—Department of Computer Science and Engineering; Sep. 2011; 12 pages.
Mei et al.; "Topic Sentiment Mixture: Modeling Facets and Opinions in Weblogs"; Department of Computer Science, University of Illinois at Urbana-Champaign, WWW (2007); 18 pages.

* cited by examiner

Algorithm 1 Learning Algorithm for Modeling User Attitude

---

Input: user-tweet re-tweeting matrix R, user-opinion matrix O, user-sentiment matrix P, user features X, $\lambda, \eta, \varphi, \alpha$
Output: W, S, V

1: Initialize W, S, and V
2: while Not Convergent do
3:     Set $A = V^T V W X^T X + \lambda W X^T X + \eta S S^T W X^T X + \varphi e_o e_x^T + \alpha W$
4:     for $i = 1$ to $f$ do
5:         for $j = 1$ to $n$ do
6:             update $W(i,j) \leftarrow W(i,j) \sqrt{\frac{[V^T R^T X + \lambda O^T X + \eta S P^T X](i,j)}{A(i,j)}}$
7:         end for
8:     end for
9:     for $i = 1$ to $d$ do
10:        for $k = 1$ to $k$ do
11:            update $S(i,j) \leftarrow S(i,j) \sqrt{\frac{\eta (W X^T P)(i,j)}{[\eta (W X^T X W^T S) + \alpha S](i,j)}}$
12:        end for
13:     end for
14:     for $i = 1$ to $n$ do
15:        for $k = 1$ to $d$ do
16:            update $V(i,j) \leftarrow V(i,j) \sqrt{\frac{(R^T X W^T)(i,j)}{[V W X^T X W^T + \alpha V](i,j)}}$
17:        end for
18:     end for
19: end while
20: return W, S, V

MODELING USER ATTITUDES TOWARD A TARGET FROM SOCIAL MEDIA

STATEMENT REGARDING FEDERALLY SPONSORED RESEARCH OR DEVELOPMENT

This invention was made with Government support under W911NF-12-C-0028 awarded by Army Research Office. The Government has certain rights in this invention.

BACKGROUND

The present disclosure relates generally to social media based analytics, and more specifically, to modeling user attitudes toward a target from social media and using the model to predict future behavior of users.

Microblogging networks are increasingly evolving into broadcasting networks with strong social aspects. More and more often, some networks are being used as channels for reaching out and marketing to its users. As such, content aggregators continuously seek new ways to maximize the impact of their messages.

SUMMARY

Embodiments include a method, system, and computer program product for user attitude modeling and behavior prediction for a social media network. The method includes collecting data relating to previously demonstrated sentiments, opinions, and actions attributed to a plurality of social media network users toward a topic. The method also includes creating a model from the data. The model creation includes factorizing the actions for behavior inference, factorizing auxiliary content from the social media network for opinion and sentiment inferences, and applying sentiment regularization and opinion regularization for respective sentiments and opinions to constrain user preferences attributable to the plurality of social media network users on implicit topics to explicit sentiments and explicit opinions. The method further includes applying the model to a new user of the social media network with respect to the topic, and generating a prediction with respect to the new user that includes predicting sentiment and opinion of the new user as a function of the auxiliary content and feature coefficients learned during a training process, and predicting a future action of the new user as a function of the auxiliary content and latent profiles of the topic.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein provide attitude modeling and behavior prediction for a social media network. A predictive model of attitude towards a target is developed from prior observations, and the predictive model is applied to predict attitudes of network users. The predictive model of attitude jointly models sentiment (polarity), opinion and action and learns the relationships among these factors. In addition, the embodiments provide a user interface for enabling configurable parameters for use by the model, such as applying the model to a particular number of user posts or applying the model to a top percentage or number of targets or topics.

Figure 1:
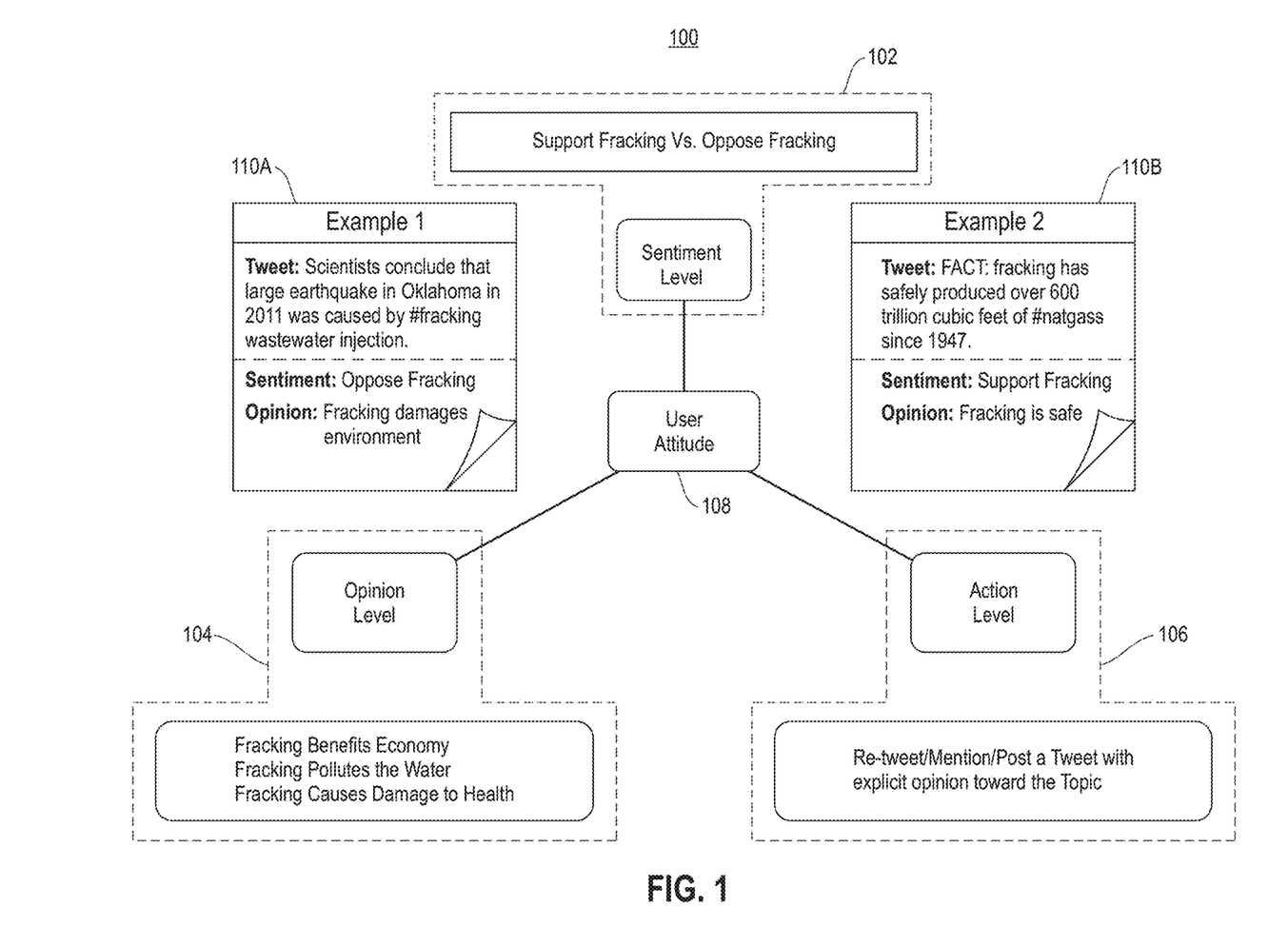
FIG. 1 depicts an example of user attitudes toward a topic.

FIG. 1 depicts a diagram 100 illustrating example components of user attitudes toward a topic in a social media environment. The topic (also referred to herein as "target") of the attitude is 'fracking' and the social media environment is TWITTER™. At a sentiment level 102, it shows two sentiments toward the topic of fracking (i.e., one in support of fracking and one that is opposed to fracking). While it is possible that a network user may neither support nor oppose fracking, for clarity, the diagram 100 does not depict a neutral sentiment. At an opinion level 104, a user may have one or more opinion with respect to different facets or aspects of fracking. For example, "fracking damages the environment," is an opinion regarding the 'environment' facet of fracking, and an example tweet 110A reflects this opinion. Similarly, another opinion, "fracking is safe," regards the 'safety' facet of the topic of fracking, and an example tweet 110B reflects this opinion. Each opinion has a sentiment associated with it (e.g., the first opinion in tweet 110A is negative toward fracking and the second opinion in tweet 110B is positive toward fracking). A user who has multiple (even differing) opinions may have an overall sentiment toward the topic (not shown). At an action level 106, a user may re-tweet, mention, or post a tweet containing such opinions. Each of these levels 102, 104, and 106 form a user attitude 108. While the above example relates to TWITTER, it will be understood that other types of social networks may be used. For example, opinions and actions may be expressed through a 'like' feature, a 'comment' feature, a 'share' feature, and even a 'follow' feature associated with one or more other types of social networks.

The embodiments described herein capture the relationships among these components (sentiment, opinion, and action) using a feature-based collaborative filtering method, which components are employed as a model on social media network data to facilitate action prediction and sentiment based on a user's opinions. Thus, the embodiments enable an entity, such as a recommender engine, to predict the likelihood of a user performing an action based on a current sentiment/opinion toward a topic.

Using TWITTER as an example social media platform, it is understood that people often express their attitudes toward a topic by re-tweeting a tweet containing an opinion. A user's re-tweeting action toward a target (tweet) is driven by two factors: the user who performs the action on the target, and the target which is acted on. Different users may have different preferences on different targets (tweets), resulting in various re-tweeting actions. The embodiments described herein capture a user's preferences toward a tweet when inferring his/her re-tweeting behavior.

The user's preferences may be inferred using collaborative filtering methods, such as matrix factorization. The matrix factorization approach facilitates the inference of a user's probability of taking an action on the target (e.g., re-tweeting a tweet).

In an embodiment, the attitude modeling processes described herein construct ground truth from previously demonstrated user actions and sentiments/opinions toward a target in a social media environment. An attitude ground truth may be an action with polarity of attitude towards a target e.g., re-tweeting an opinion about a topic may be used as attitude ground truth. For example, re-tweeting the following tweet may be considered as a ground truth attitude expressed in favor of 'anti-vaccination:' "The side-effect of this particular rabies vaccination is flu-like symptoms and muscle aches. #betterthanrabies."

In another embodiment, tweet creation about a topic (target) may be considered a ground truth. Ground truth creation also involves applying appropriate labels for sentiment/opinion/action. In one embodiment, such labelling is done through a supervised (manual) approach. In another embodiment, this can be done using a semi-supervised approach where unsupervised techniques such as topic modeling and sentiment analysis can be used together with manual labeling.

Once the attitude ground truth is collected from social media, attitude models may be constructed from the ground truth data in a joint framework for predicting attitude polarity, opinion, and action.

A user action (e.g., re-tweet) toward a target (e.g., tweet) in social media is driven by two factors, the user who performs the action (e.g., re-tweet) on the target, and the target itself (e.g., tweet) which is acted on (e.g., re-tweeted). Different users may have different preferences on different targets (e.g., tweets) in social media resulting in various actions. Therefore, predicting a user's specific actions can be analogous to capturing the user's preferences toward the target.

Collaborative filtering methods are commonly utilized to infer a user's preferences toward a target in recommender systems, e.g., watching a movie, rating an item, etc. The basic idea of collaborative filtering is to approximate a user's interests towards a target based on other similar users' observed interests towards that target. Matrix factorization may be implemented to perform the collaborative filtering on the ground truth data.

Thus, in an embodiment, matrix factorization is implemented to factorize actions for behavior inference, as will now be described.

Let $u=\{u_1, us_2, \ldots, u_m\}$ be the set of users, and $v=\{v_1, v_2, \ldots, v_n\}$ be the set of tweets, where m and n denote the number of users and tweets, respectively. $R \in R_{m \times n}$ is a user-tweet matrix with each element $R_{ij}$ representing the re-tweeting action made by user $u_i$ toward a tweet $v_j$. $R_{ij}=1$ indicates that there is a re-tweeting action, and 0 otherwise.

Let $U \in R_{m \times d}$ be the user latent preferences and $V \in R_{n \times d}$ be the tweet latent profile, $d \ll \min(m, n)$ being the number of latent preferences factors. The basic MF model approximates $u_i$'s re-tweeting preferences on a tweet $v_j$ and may be expressed as:

$$\min_{U,V} \|R - UV^T\| + \mathcal{L}(U, V) \quad (1)$$

Where $\mathcal{L}(U, V)$ represents appropriate regularization terms with respect to the latent factors. R represents the user-target matrix (e.g., representing re-tweeting actions), U represents the user latent factor (users' latent preferences), and V represents a target latent factor (e.g., tweets' latent profile). In recommender systems, U represents users' preferences on latent facets and V represents targets' characteristics of the corresponding latent facets. Therefore, an action on a target is determined by a user's preferences and a target's characteristics. Furthermore, since the latent factors represent a user's preferences (opinions) on latent facets (topics), which give interpretations to the user opinions, it could be potentially utilized to model the user opinions.

At this point, the MF model may not be directly applied to attitude modeling with social media data generated from an online campaign, due to differences in data properties and challenges, such as cold starts, implicit user opinions, and unknown overall sentiment of a user.

In the MF approach, user preferences are inferred through observed overlapping interests between two users. Thus, the density of R may have a significant effect on the model performance. The effectiveness of recommender systems having sparse data sets (e.g., a low density user-tweet matrix) may be quite low, resulting in low performance, as well as a condition referred to as cold-starts with respect to an online campaign. A cold start refers to a scenario regarding users who have no, or very few, observed re-tweeting information.

Figure 2:
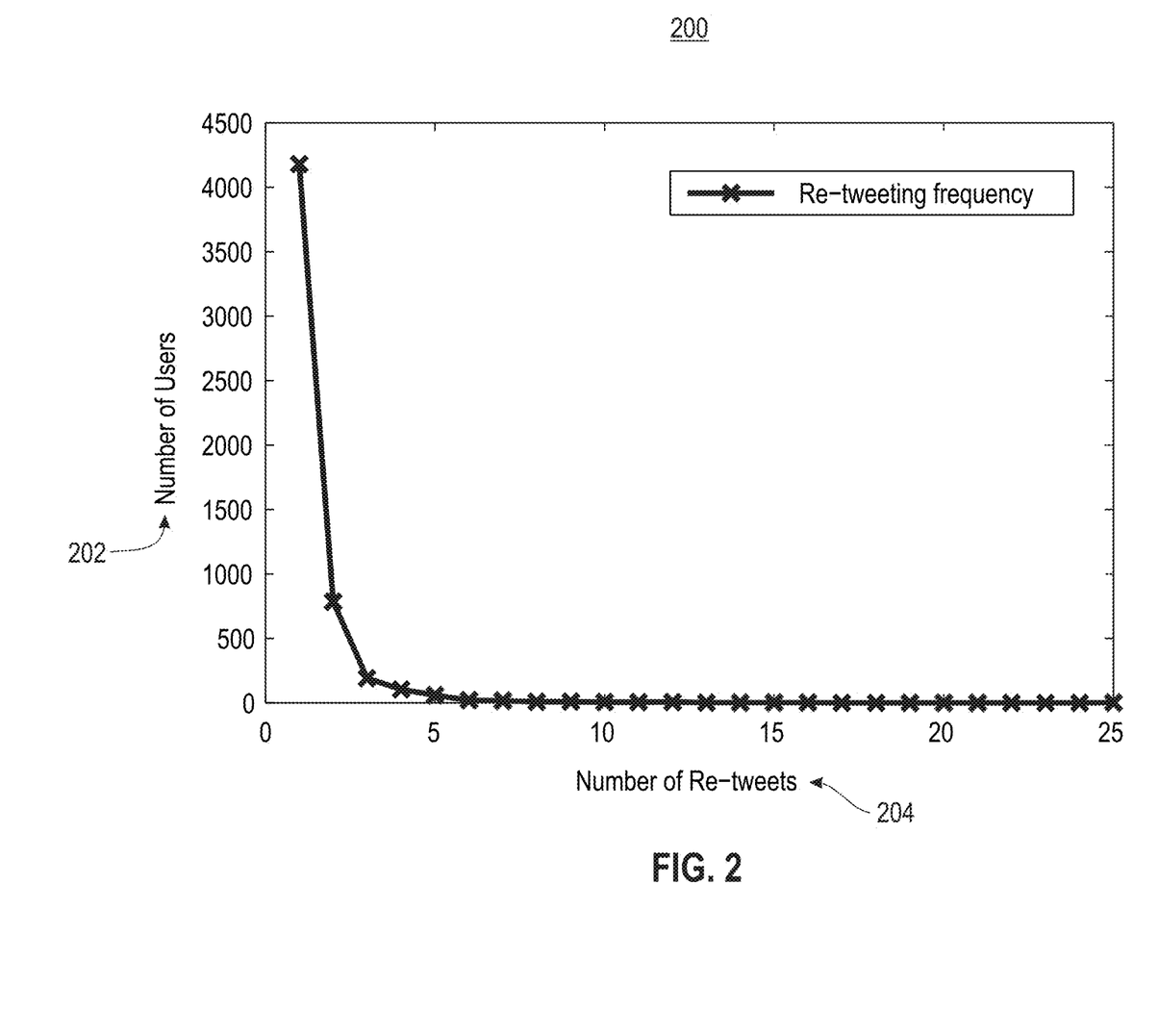
FIG. 2 depicts a graph illustrating statistics indicative of a sparse distribution for a given action.

FIG. 2 plots the re-tweeting statistics in a graph 200, which presents a commonly occurring power-low-like distribution. The x-axis 204 represents the number of re-tweets and the y-axis 202 represents the number of users who have such number of re-tweets. It demonstrates that majority users in an online campaign are cold-start users who rarely express their attitude toward the topic through actions. Techniques relying on various observations of actions may fail due to the lack of information. However, social media sites provide abundant user-related information, such as posts, friendships, content, etc., as part of a user's profile and content posted. This user-related information is referred to herein as "auxiliary information." The auxiliary information may include data from a user' profile, content from the user's inputs (e.g., key words contained in a tweet), and aspects of the social network (e.g., type of social network and size of social network, overlap of certain users' interests). Such information could be utilized as user-related features, and provides the ability to approximate a user's preferences without observing sufficient user actions. Thus, the embodiments described herein introduce user-related features to estimate a user's latent preferences as described herein.

Moreover, in the MF model, a user's $u_i$ latent preferences indicate his/her preferences on latent factors of a topic. Although such preferences are conceptually similar to a user's opinions, they cannot be explicitly described. The attitude modeling processes described herein provide techniques to bridge the gap between the latent preferences factorized by MF and explicit opinions expected to be returned as output.

Additionally, the basic MF approach models a user's actions through latent user preferences, while the overall sentiment is not considered. However, a user may present multiple opinions containing both positive and negative sentiment of the topic, which raises challenges in inferring his/her overall sentiment.

The embodiments described herein provide the ability to model user attitude in terms of feature selection for preference approximation, opinion regularization, and sentiment regularization.

The user-related features (auxiliary content) introduced to estimate a user's latent preferences may be expressed as:

$$\min_{W,V} \|R - F(W, X)V^T\| + \varphi\|W\|_1 + \mathcal{L}(W, V) \quad (2)$$

Where $F(W,X)=XW^T$ is a linear function with $X \in R_{m \times f}$ as user-related features, and $w \in R_{d \times f}$ as the feature coefficient, and f denotes the dimension of user feature space. Considering the large amount of user-generated content in social media, the feature space is typically large in dimension. The attitude modeling processes may utilize a technique, such as Lasso, with respect to the model for implementing simultaneous feature selection. Here, $\|W\|_1$ is the corresponding sparse regularization term, where $\|\cdot\|_1$ represents 1-norm of a matrix with $\|W\|_1 = \Sigma_i \Sigma_j W_{i,j}$, $\varphi$ as the parameter to control the feature sparsity.

The basic MF model factorizes the action matrix into two latent factors, user preferences and target (e.g., tweet) profiles. In order to discover user opinions, the embodiments provide a technique to constrain the user preferences on latent (implicit) factors into explicit opinions using an opinion regularization, which may be expressed as shown below.

$$\min_W \mathcal{L}_O = \|F(W, X) - O\| \quad (3)$$
$$\text{s.t. } W \geq 0$$

Here, $O \in \mathbb{R}^{m \times d}$ denotes user-opinion distribution observed from training data. Each element, $O_{i,j}$ is a categorical value representing user i's preferences on opinion j. By minimizing the distance between factorized user latent preferences and observed user opinion distribution, one may force the factorized latent user preferences bounded in the opinion space, therefore making the implicit latent preferences explicitly representing user opinions. It will be noted that a non-negative constraint on the opinion space has been introduced in Equation (3) above, since the opinion strength in a real-world application is commonly non-negative.

Since a user may hold more than one opinion containing both positive and negative aspects, determining the overall sentiment from a user's opinions becomes difficult, as the relationships among them are unknown. The attitude modeling processes described herein incorporate a transition matrix to capture such relationships under the following sentiment constraint:

$$\min_W \mathcal{L}_P = \|F(W, X)S - P\| \quad (4)$$
$$\text{s.t. } W \geq 0, S \geq 0$$

$S \in \mathbb{R}^{d \times k}$ denotes an opinion-sentiment transition matrix where k is the number of sentiment polarities (k may be set to 2 representing positive and negative). $P \in \mathbb{R}^{m \times k}$ denotes user sentiment distribution observed from training data. The non-negative constraint of the transition matrix is introduced to better capture user sentiment strength.

Thus, the basic MF model, extended as described above, may now be expressed as:

$$\min_{W \geq 0, S \geq 0, V \geq 0} \|R - F(W, X)V^T\|_F^2 + \lambda\|F(W, X) - O\|_F^2 + \quad (5)$$
$$\eta\|F(W, X)S - P\|_F^2 + \varphi\|W\|_1 + \alpha(\|W\|_F^2 + \|V\|_F^2 + \|S\|_F^2)$$
$$\text{s.t. } F(W, X) = XW^T.$$

where $\lambda$ and $\eta$ controls the opinion regularization and sentiment regularization, respectively. A small $\lambda(\eta)$ indicates a weak relationship between the factorized latent factor and the observed opinions (sentiment), while a large $\lambda(\eta)$ indicates they are forced to be as close as possible. A parameter a is introduced to avoid over-fitting.

Figure 3:
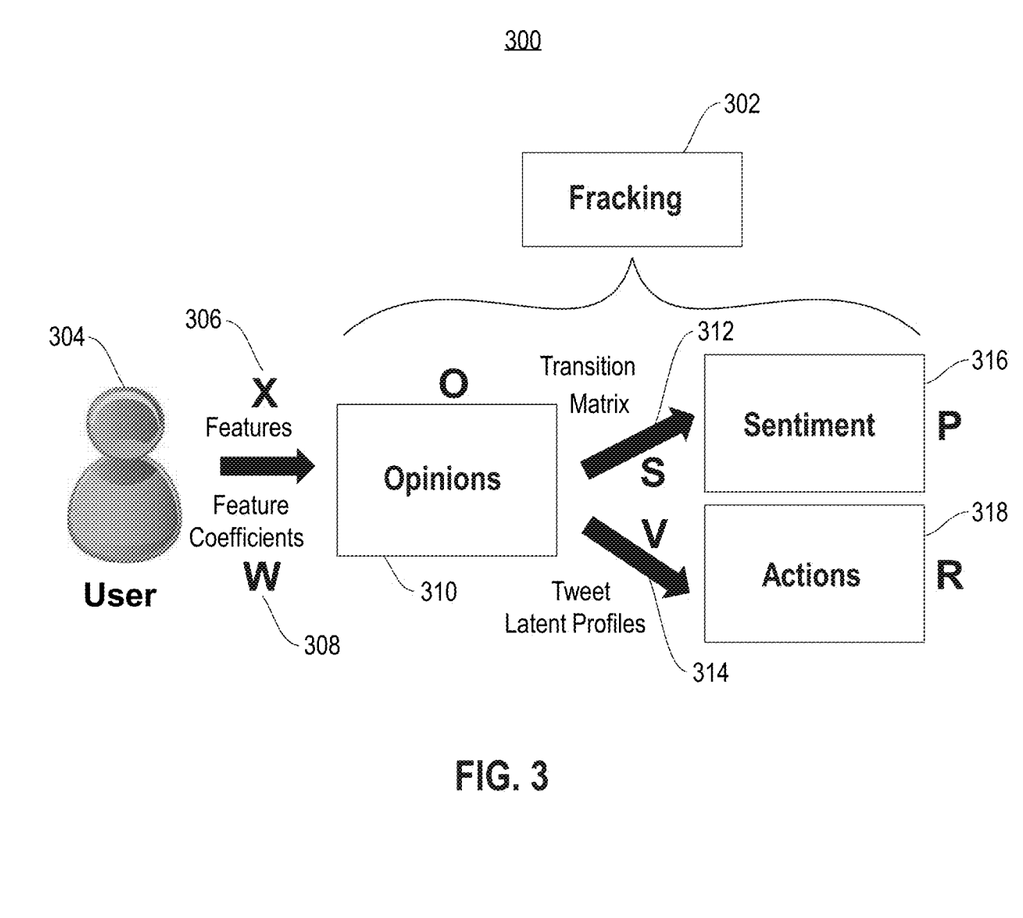
FIG. 3 depicts an operation of an attitude model in accordance with an embodiment.

FIG. 3 depicts operation of the attitude model once it is generated in accordance with some embodiments. In the model 300, a user 304 holds opinions toward the topic 302, which are approximated through user-related features 306. The opinions 310 and tweet latent profile 314 together result in an action 318 (e.g., re-tweeting). Opinions 310 also transfer to sentiment 316 through a transition matrix 312. Input to the model 300 is a set of training features 306 with the corresponding sentiment P, opinions O, action history R, and user features X Outputs are Feature Coefficients W 308 (Opinion Level), Transition Matrix S 312 (Sentiment Level,), and Tweet Latent Profile V 314 (Action Level).

Figure 4:
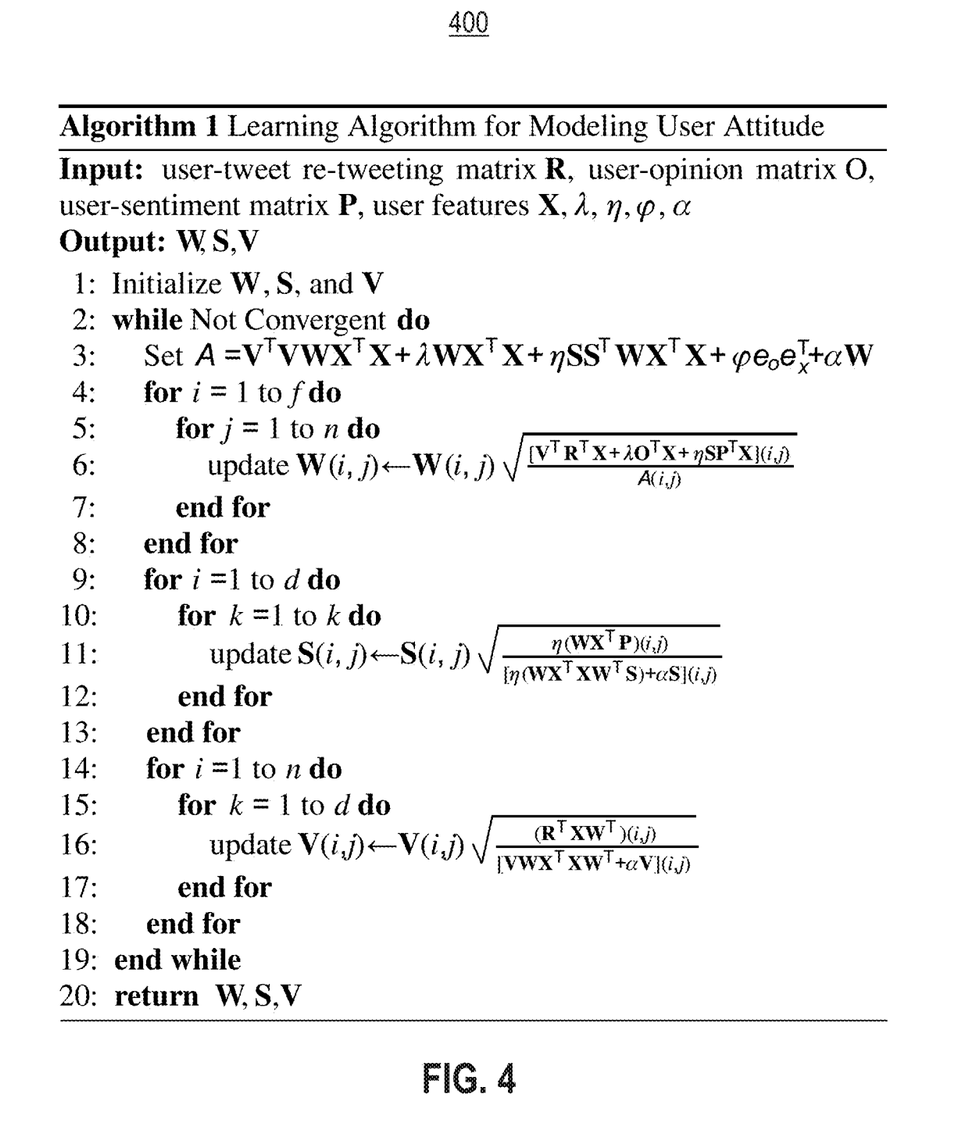
FIG. 4 depicts a sample learning algorithm for modeling user attitude in accordance with an embodiment.

FIG. 4 depicts a sample learning algorithm 400 for modeling user attitude in an embodiment. Compared to other operations, the updating rules for W, S, and V, in each iteration, correspond to the major cost of algorithm 400. As such, the time complexity of updating operations is analyzed. For the updating rule of W, $V^TR^TX$ takes O(mdn)+ O(mdf) operations. Since f>>n is typical, the overall complexity as O(mdf) is considered. On the other hand, $O^TX$ and $SP^TX$ both take O(mdf) operations, while the computation of A also takes O(mdf) operations. Therefore, it takes O(mdf) operations to update W. Similarly, the time complexity of updating S and V are O(mdf) and O(mnf), respectively. Due to the sparsity of R and X, n can be approximated by d, while f can be approximated by a small dimension f' (f>>f'). Therefore, O(mnf) can be approximated by O(mdf), and O(mdf) can be approximated by O(mdf'). Thus, the time complexity of algorithm 400 is (# of iterations)*O(mdf').

Once the attitude model is trained, the model may be applied to predict the attitude of a new user u. In particular, the predictions may include opinion prediction, sentiment prediction, and attitude prediction. Sentiment/opinion is predicted as a function of user features and feature coefficients learned during training process. Action is predicted as a function of user features and latent profile of the target.

Opinion prediction will now be described in an embodiment. For a user u, by obtaining the corresponding features $X_u$, the model can predict his/her opinion $O_u$ through $O_u = F(X_u, W) = X_u W_t$, where W is the feature coefficient that was learned from the model. Since a user may hold more than one opinion, this process corresponds to a multi-label classification scenario.

The sentiment of a user u is estimated through the user-related features $X_u$, and the opinion-sentiment transition matrix S learned from the model, i.e., $P_u = F(X_u, W) S = X_u W^T S$.

The probability of user u taking an action on a target (e.g., tweet) t is estimated through the user-related features $X_u$, and the tweets latent profile $V_j$, i.e., $R_{i,j}=X_u W^T V_j^T$. Similar to opinion prediction, a user may re-tweet more than one tweet; therefore, this task also corresponds to a multi-label classification scenario.

Figure 5:
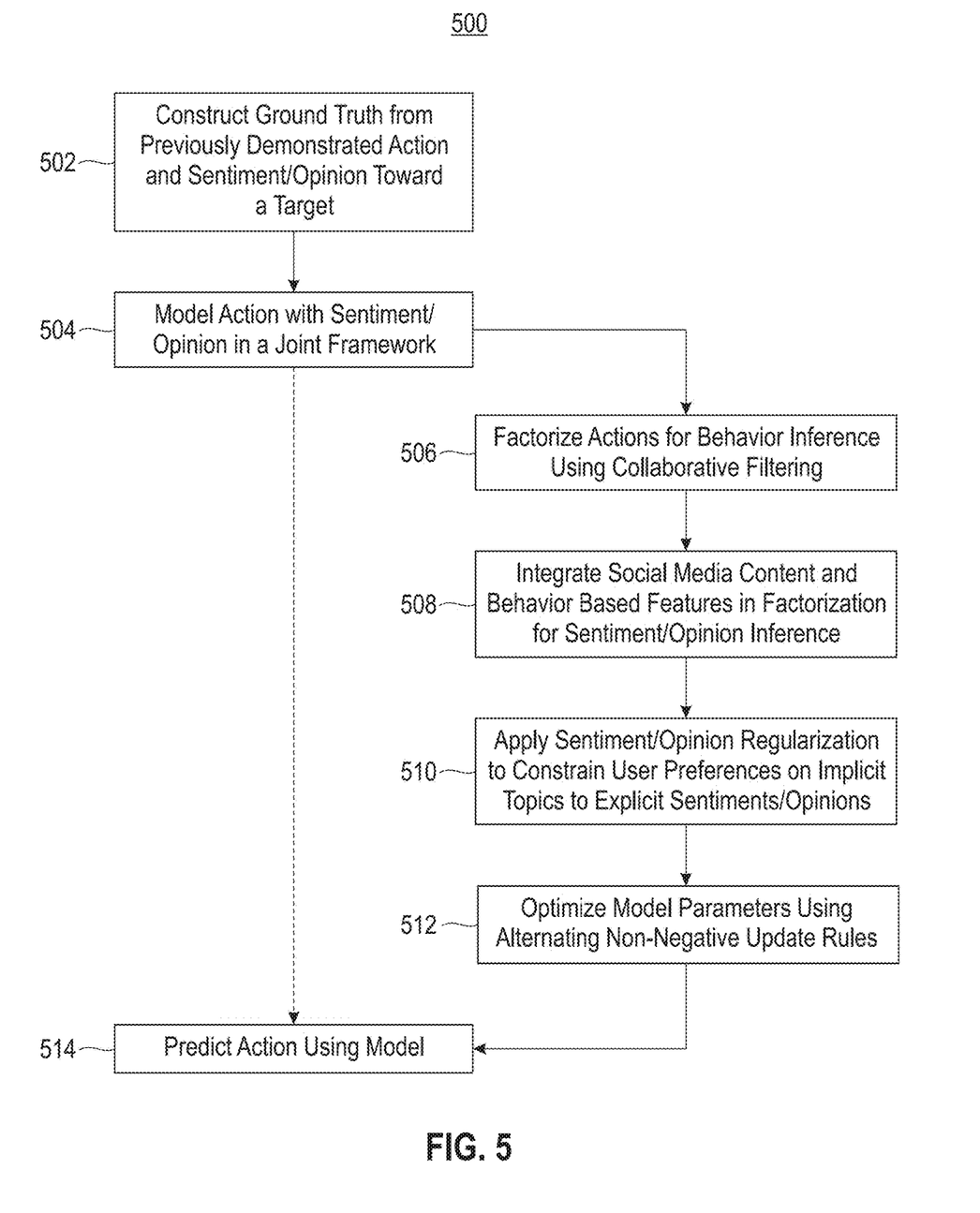
FIG. 5 depicts a process flow for modeling user attitude in accordance with an embodiment.

Referring now to FIG. 5, a flow diagram describing a process 500 for implementing the attitude modeling features will now be described in an embodiment. At block 502, ground truth is constructed from previously demonstrated actions, sentiments, and opinions toward a target (topic) by a plurality of network users.

At block 504, actions are modeled with sentiment and opinion in a joint framework including relationships therebetween. The modeling activities are described in blocks 506 through 512, as will now be described. Actions are factorized for behavior inference using collaborative filtering, such as matrix factorization. In addition, at block 508, auxiliary content is factorized for opinion and sentiment inferences.

At block 510, sentiment and opinion regularization are implemented to constrain the user preferences on implicit topics to explicit sentiments and opinions.

At block 512, model parameters are optimized using alternating non-negative update rules.

At block 514, the model is applied to a user of the social media network with respect to the topic, and a prediction is generated. The sentiment and opinion are predicted as a function of the auxiliary content and feature coefficients learned during a training process, and an action is predicted as a function of the auxiliary content and latent profiles of the topic.

In an embodiment, the attitude modeling and prediction processes may be facilitated through an interface in which an entity, such as a subject matter expert, may define various parameters for use by the model. In one embodiment, the entity may desire to parameterize the number of tweets (or postings) that will be used by the model (e.g., the process may obtain the most recent 200 tweets on a given topic). In addition, through the interface, the entity may designate a number of different topics for collecting the data.

In a further embodiment, the subject matter expert can perform temporal analysis of user attitudes to see a temporal evolution of attitudes. For example, the subject matter expert may enter a number of segments (S) from the interface for temporal analysis. The system divides the user's social media posts into S equally spaced segments in temporal dimension and the model is applied to determine user attitude, as described above. The temporal analysis may be conducted based on day of week, hour of day, or year/month, etc.

In another embodiment, the interface may provide output from the model, such as the content of a tweet associated with the topic.

Figure 6:
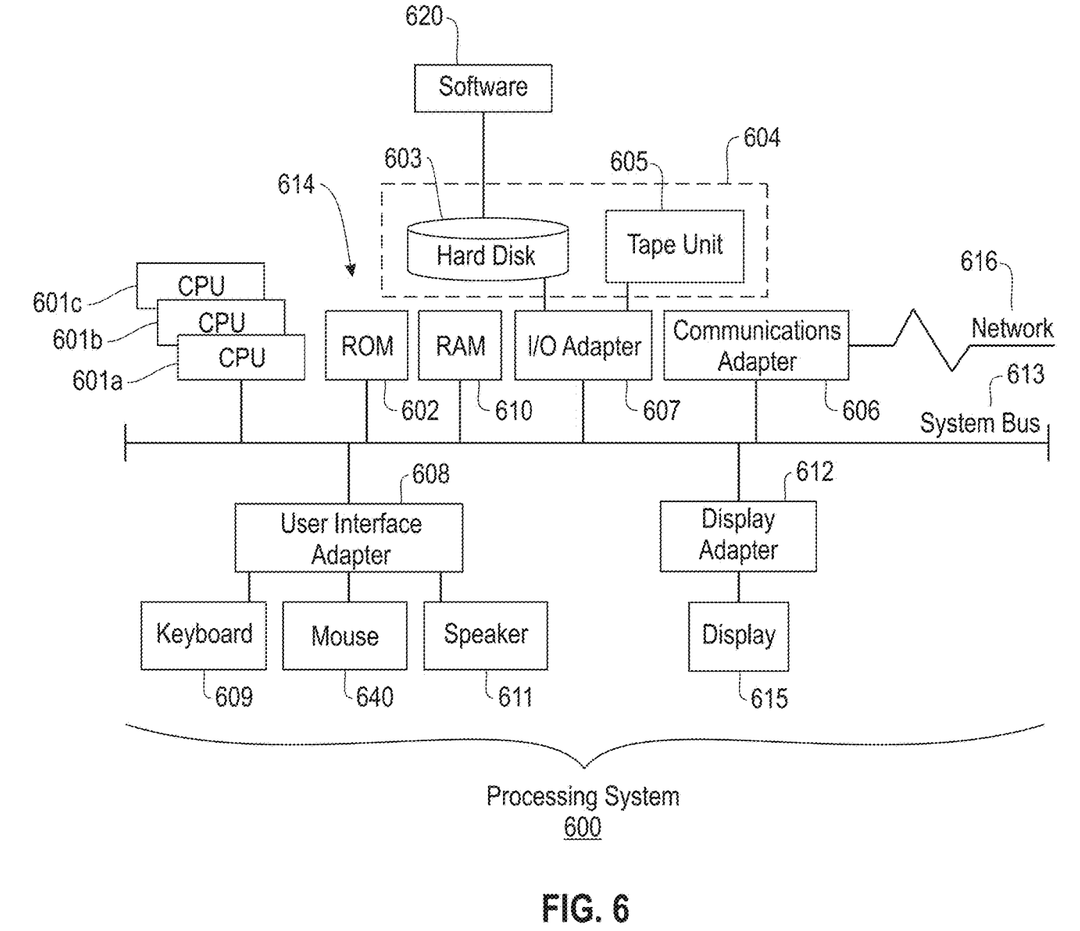
FIG. 6 depicts a processing system for modeling user attitude in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601 are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

Technical effects of user attitude modeling and behavior prediction embodiments described herein model user behavior in a social media environment and the model is applied to a user's social media content in order to predict the user's future actions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for user attitude modeling and behavior prediction for a social media network, the method comprising:
    collecting training-data relating to previously demonstrated user attitudes, including sentiments, opinions, and actions, attributed to a plurality of social media network users toward a topic;
    creating a model from the data, comprising:
        factorizing the actions for behavior inference;
        factorizing auxiliary content from the social media network for opinion and sentiment inferences, wherein the auxiliary content includes a user's profile data, content from the user's inputs, and aspects of the social media network;
        applying sentiment regularization and opinion regularization for respective sentiments and opinions by constraining user preferences attributable to the plurality of social media network users on implicit topics to explicit sentiments and explicit opinions; and
        determining an overall sentiment, separately for each of the social media network users, from multiple opinions held by each of the social media network users with respect to the topic, the overall sentiment predicted by incorporating an opinion-sentiment transition matrix having two sentiment polarities into the model to capture relationships between multiple opinions held by one of the social media network users and corresponding sentiments;
    applying the model over a number of time segments to perform temporal analysis of the overall sentiment to provide a temporal evolution of user attitudes through an interface to another user;
    applying the model to a new user (u) of the social media network with respect to the topic; and
    generating a prediction of an attitude by the new user with respect to the topic comprising predicting sentiment and opinion of the new user as a function of the auxiliary content and feature coefficients learned during a training process, and predicting a future action of the new user as a function of the auxiliary content and latent profiles of the topic, wherein generating the prediction of the attitude comprises:
        predicting an opinion $O_u$ of the new user using the model: $O_u = F(X_u, W) = X_u W_t$, where W is the feature coefficient that was learned from the model, and $X_u$ represents a matrix of user-related features;
        predicting a sentiment $P_u$ of the new user using the model: $P_u = F(X_u, W)S = X_u W^T S$, where the opinion-sentiment transition matrix S is learned from the model; and
        determining a probability of the new user taking an action on the topic: $R_{i,j} = X_u W^T V^T_j$, where a topic profile V is learned from the model.

2. The method of claim 1, further comprising:
    optimizing model parameters of the model using alternating non-negative update rules.

3. The method of claim 1, wherein the auxiliary content includes at least one of:
    user profile data;
    content of social media network posts; and
    aspects of the social media network.

4. The method of claim 1, wherein the collecting data relating to previously demonstrated sentiments, opinions, and actions includes parameterizing a user-configurable number of postings for use by the model.

5. The method of claim 1, wherein the topic is one of multiple topics, and the collecting data relating to previously demonstrated sentiments, opinions, and actions includes parameterizing a number of the multiple topics for the collecting.

6. The method of claim 1, wherein the collecting data relating to previously demonstrated sentiments, opinions, and actions includes parameterizing at least one of the plurality of social media network users' postings into a user-configurable number of posts in temporal dimension.

7. The method of claim 1, wherein the model is expressed as:

$$\min_{W\geq 0, S\geq 0, V\geq 0} \|F(W,X) - O\|_F^2 + \lambda\|F(W,X) - O\|_F^2 + \varphi\|W\|_1 + \alpha(\|W\|_F^2 + \|V\|_F^2 + \|S\|_F^2), \text{ s.t. } F(W,X) = XW^T,$$

where $F(W,X) = XW^T$ is a linear function with $X \in \mathbb{R}^{m \times f}$ denotes user-related features, $W \in \mathbb{R}^{d \times f}$ denotes the feature coefficient, and f denotes the dimension of user feature space, O denotes user-opinion distribution from the training-data, each element $O_{i,j}$ represents a user i's sentiments on opinion j, $S \in \mathbb{R}^{d \times k}$ denotes an opinion-sentiment transition matrix where k is the number of sentiment polarities, $P \in \mathbb{R}^{m \times k}$ denotes user sentiment distribution observed from the training-data, $V \in \mathbb{R}_{n \times d}$ is the latent action profile, d being the number of preferences factors in the latent action profile, and where λ and η control the opinion regularization and the sentiment regularization, respectively, and α is a preconfigured parameter to avoid over-fitting.

8. A computer program product for user attitude modeling and behavior prediction for a social media network, the computer program product comprising a computer readable storage medium having program code embodied therewith, the program code executable by a processor to:
    collect data relating to previously demonstrated user attitudes, including sentiments, opinions, and actions, attributed to a plurality of social media network users toward a topic;
    create a model from the data, comprising:
        factorize the actions for behavior inference;
        factorize auxiliary content from the social media network for opinion and sentiment inferences, wherein the auxiliary content includes a user's profile data, content from the user's inputs, and aspects of the social media network;
        apply sentiment regularization and opinion regularization for respective sentiments and opinions to constrain user preferences attributable to the plurality of social media network users on implicit topics to explicit sentiments and explicit opinions;
        determine an overall sentiment, separately for each of the social media network users, from multiple opinions held by each of the social media network users with respect to the topic, the overall sentiment predicted by incorporating an opinion-sentiment transition matrix having two sentiment polarities into the model to capture relationships between multiple opinions held by one of the social media network users and corresponding sentiments;
    apply the model over a number of time segments to perform temporal analysis of the overall sentiment to provide a temporal evolution of user attitudes through an interface to another user;

apply the model to a new user (u) of the social media network with respect to the topic; and generate a prediction of an attitude by the new user with respect to the topic comprising predicting sentiment and opinion of the new user as a function of the auxiliary content and feature coefficients learned during a training process, and predicting a future action of the new user as a function of the auxiliary content and latent profiles of the topic, wherein generating the prediction of the attitude comprises:

predicting an opinion $O_u$ of the new user using the model: $O_u = F(X_u, W) = X_u W_t$, where W is the feature coefficient that was learned from the model, and $X_u$ represents a matrix of user-related features;

predicting a sentiment $P_u$ of the new user using the model: $P_u = F(X_u, W)S = X_u W^T S$, where the opinion-sentiment transition matrix S is learned from the model; and determining a probability of the new user taking an action on the topic: $R_{i,j} = X_u W^T V^T_j$, where a topic profile V is learned from the model.

9. The computer program product of claim 8, wherein the program code is executable by a processor to:

optimize model parameters of the model using alternating non-negative update rules.

10. The computer program product of claim 8, wherein the auxiliary content includes at least one of:

user profile data;

content of social media network posts; and aspects of the social media network.

11. The computer program product of claim 8, wherein collection of the data relating to previously demonstrated sentiments, opinions, and actions includes parameterizing a user-configurable number of postings for use by the model.

12. The computer program product of claim 8, wherein the topic is one of multiple topics, and collection of the data relating to previously demonstrated sentiments, opinions, and actions includes parameterizing a number of the multiple topics for the collection.

13. The computer program product of claim 8, wherein collection of the data relating to previously demonstrated sentiments, opinions, and actions includes parameterizing at least one of the plurality of social media network users' postings into a user-configurable number of posts in temporal dimension.

14. A system for user attitude modeling and behavior prediction for a social media network, the system comprising:

a memory having computer readable computer instructions; and a processor for executing the computer readable instructions, the computer readable instructions including:

collecting data relating to previously demonstrated user attitudes, including sentiments, opinions, and actions, attributed to a plurality of social media network users toward a topic;

creating a model from the data, comprising:

factorizing the actions for behavior inference;

factorizing auxiliary content from the social media network for opinion and sentiment inferences, wherein the auxiliary content includes a user's profile data, content from the user's inputs, and aspects of the social media network;

applying sentiment regularization and opinion regularization for respective sentiments and opinions to constrain user preferences attributable to the plurality of social media network users on implicit topics to explicit sentiments and explicit opinions;

determining an overall sentiment, separately for each of the social media network users, from multiple opinions held by each of the social media network users with respect to the topic, the overall sentiment predicted by incorporating an opinion-sentiment transition matrix having two sentiment polarities into the model to capture relationships between multiple opinions held by one of the social media network users and corresponding sentiments;

applying the model over a number of time segments to perform temporal analysis of the overall sentiment to provide a temporal evolution of user attitudes through an interface to another user;

applying the model to a new user (u) of the social media network with respect to the topic; and generating a prediction of an attitude by the new user with respect to the topic comprising predicting sentiment and opinion of the new user as a function of the auxiliary content and feature coefficients learned during a training process, and predicting a future action of the new user as a function of the auxiliary content and latent profiles of the topic, wherein generating the prediction of the attitude comprises:

predicting an opinion $O_u$ of the new user using the model: $O_u = F(X_u, W) = X_u W_t$, where W is the feature coefficient that was learned from the model, and $X_u$ represents a matrix of user-related features;

predicting a sentiment $P_u$ of the new user using the model: $P_u = F(X_u, W)S = X_u W^T S$, where the opinion-sentiment transition matrix S is learned from the model; and determining a probability of the new user taking an action on the topic: $R_{i,j} = X_u W^T V^T_j$, where a topic profile V is learned from the model.

15. The system of claim 14, wherein the auxiliary content includes at least one of:

user profile data;

content of social media network posts; and aspects of the social media network.

16. The system of claim 14, wherein the collecting data relating to previously demonstrated sentiments, opinions, and actions includes parameterizing a user-configurable number of postings for use by the model.

17. The system of claim 14, wherein the topic is one of multiple topics, and the collecting data relating to previously demonstrated sentiments, opinions, and actions includes parameterizing a number of the multiple topics for the collecting.

18. The system of claim 14, wherein the collecting data relating to previously demonstrated sentiments, opinions, and actions includes parameterizing at least one of the plurality of social media network users' postings into a user-configurable number of posts in temporal dimension.

* * * * *